Aug. 28, 1956  F. GOTTSCH  2,760,374
APPARATUS FOR TESTING FABRICATED PRODUCTS
Filed June 15, 1951
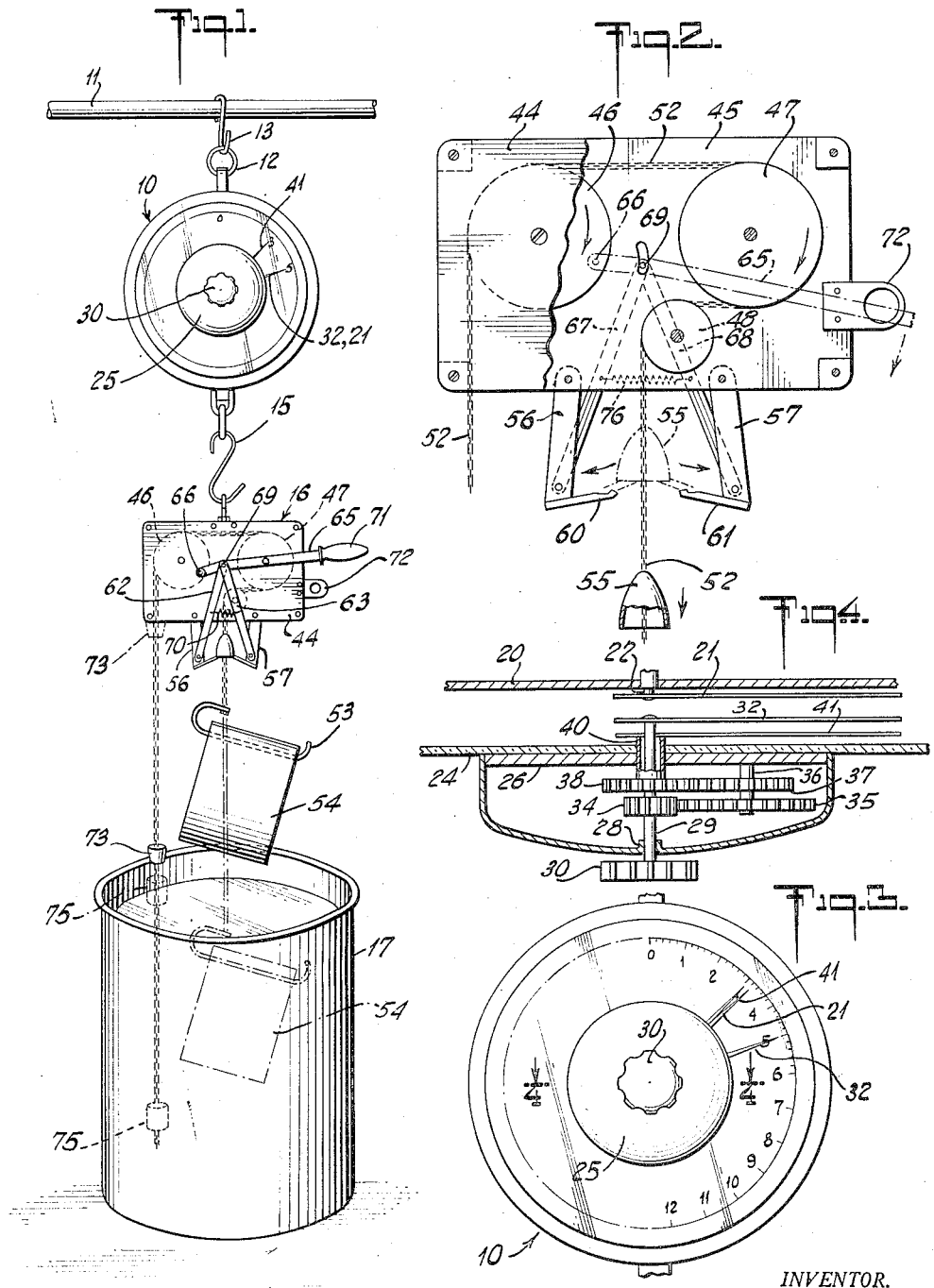
INVENTOR.
FRANK GOTTSCH.
BY Virgil O. Kline
ATTORNEY.

United States Patent Office 2,760,374
Patented Aug. 28, 1956

2,760,374
APPARATUS FOR TESTING FABRICATED PRODUCTS

Frank Gottsch, Plainfield, N. J., assignor to Johns-Manville Corporation, New York, N. Y., a corporation of New York Application June 15, 1951, Serial No. 231,877

10 Claims. (Cl. 73—437)

My invention is concerned particularly with an apparatus for testing or inspecting manufactured products by measuring or determining the relative density of an individual object to thereby ascertain whether or not there may be flaws in the object constituted by voids or spaces in the material of the object. The invention has particular application to products or articles fabricated or formed of various compositions in such manner that such flaws may exist in the articles thus rendering them defective rather than satisfactory. Such articles may be cylindrical pipe couplings, for example. An individual unit can be considered satisfactory if the material of the unit has a unit density of, for example, 156.25 lbs. per cu. ft. This represents a specific gravity, that is, a density, relative to water, of 2.5. Thus, if the unit, as a whole, when tested is found to have a relative density in excess of 2.5, the unit can be considered satisfactory, that is, as not being defective by reason of having flaws in the form of voids or spaces in the unit.

Accordingly, the primary object of my invention is to provide a simple, convenient, and effective means for quickly determining the relative density of manufactured products or objects.

Another object of the invention is to provide an apparatus for testing an object for flaws by the method of weighing it in air, providing a visual indication representative of that proportion of the weight in air that the object must have when weighed in water (or other liquid) in order to have a desired relative density and then weighing the object in water to determine whether or not the weight in water is greater or less than the visual indication.

Another object of the invention is to provide an apparatus for inspecting objects by determining their relative density comprising a scale, a visual indicator for giving an indication which is a predetermined portion of the weight in air of an object as indicated by the scale, and means for successively weighing an object first in air and then in water.

Another object of the invention is to provide convenient manipulating means for raising and lowering objects being tested.

Further objects and numerous additional advantages of the invention will become apparent from the following detailed description and annexed drawings wherein:

Fig. 1 is a view of the complete organization of the invention showing the scale, the manipulator and latch mechanism, and the article to be tested suspended therefrom;

Fig. 2 is an enlarged view of the interior of the manipulator of Fig. 1, with the operating handle shown in outline;

Fig. 3 is an enlarged view of the face of the scale and the differential comparator;

Fig. 4 is a sectional view taken along the line 4—4 of Fig. 3.

In carrying out the invention, as pointed out in the foregoing, it can be accepted that if an object being tested has a relative density exceeding a certain minimum figure, it can be considered satisfactory. That is, it can be considered that the object is sufficiently free from voids or spaces, and therefore that the object is satisfactory rather than defective. Thus, for a certain composition, for example, it may be considered that if the material has a unit density of 156.25 lbs. per cu. ft. that the material is satisfactory. The density of water is 62.5 lbs. per cu. ft. so that the specific gravity, that is, the unit density of the composition in question, would be 2.5 times that of water.

The actual density of any object can be determined in accordance with Archimedes' principle as shown by the relation $$G = \frac{A}{A-W}$$

In this relation A represents the weight of the object in air and W is the weight of the object when immersed in water. Thus, it can be seen that for any given density there is a particular relation between the weight of the object in air and its weight in water. For a density of 2.5 this relation or ratio would be 5 to 3. That is, in the formula given above if the weight in air is 5 and the weight in water is 3, it can be seen that the density or G is 2.5.

In accordance with the foregoing my invention tests the density of the object not by actually measuring the numerical density but simply by determining whether or not the weights in air and water satisfy the above ratio. The invention is carried out in such a way and by such apparatus that the numerical value of the weights need not be ascertained, but, instead, whether or not the conditions are satisfied is determined simply by the position of one pointer relative to another. No computations or use of tables is involved.

Referring to the drawings, numeral 10 designates a commercial spring scale or dynamometer which is suspended from an overhead bar 11 by a ring 12 and hook 13, as shown. The scale is arranged to take a 5 lb. tare for zero reading, by being set back and coming to zero with certain equipment suspended from the scale, the weight of which equipment is not to enter into the test. Below the scale there is suspended by a hook 15 a device which I prefer to call a compensating manipulator designated by numeral 16. The manipulator 16 provides a convenient device for suspending an article or product to be tested and for lowering it into a tank of water 17. The scale 10 is set back and comes to zero with the manipulator 16 suspended therefrom.

The scale 10 has associated therewith a device which I prefer to call a differential comparator, the purpose of which is to set up and retain a visual indication, which indication bears a fixed ratio to the weight of an object as weighed in air. The differential comparator is shown in greater detail in Figs. 3 and 4. Referring to Fig. 4 the glass face of the scale 10 is shown at 20 and the weight indicating pointer, which may be a black pointer, is shown at 21 on a shaft 22. Spaced from the face 20 of the scale is a transparent plastic disc, as indicated at 24. Attached to the central part of the disc 24 is an aluminum housing 25 having a base 26 lying flush against the disc 24. Formed in the housing 25 is a bearing 28 for a shaft 29 on the outer end of which is an adjusting knob 30. The shaft 29 is coaxially aligned with the shaft 22 and on its inner end it carries a pointer 32 which may preferably be a black pointer. Carried on the shaft 29 is a gear 34 which rotates with shaft 29 and which meshes with the gear 35 on a stub shaft or arbor 36 extending from the base 26. Also on the shaft 36 is another gear 37 meshing with the gear 38 carrying a sleeve shaft 40 outside of the shaft 29 and which carries a red pointer 41. The gears 34 and 35 in the present equipment have a ratio of 5 to 3 which is the ratio previously described as representing that ratio between a weight in air and a weight in water representative of a relative density of 2.5. It will be understood that where other densities are involved, corresponding gear ratios will be provided. The gears 37 and 38 are in the ratio of 1 to 1 so that when the knob 30 is rotated manually, the movement of the red pointer 41 is in the ratio of 3 to 5 relative to the black pointer 32. In the operation of the system, as will be presently described, when an object is weighed in air, the black pointer 32 is manually matched with the black pointer 21, and thus the red pointer takes a position less far along the dial of the scale in accordance with the ratio of 3 to 5.

Referring again to Figs. 1 and 2 of the drawings, the compensating manipulator 16 comprises a housing formed by spaced rectangular side plates as indicated at 44 and 45 (see Fig. 2). Supported on shafts journalled between the side plates are grooved pulleys 46 and 47, the centers of these pulleys lying along a horizontal line. Supported on another shaft journalled between the side plates of the housing is a third pulley 48 so positioned that its left edge lies on a vertical line through the center of the manipulator and through the point of suspension of the manipulator. A flexible chain 52 passes over the pulleys 46 and 47 and over the pulley 48 and downwardly along a line coinciding with the suspension of the manipulator. The line of suspension is midway between the centers of pulleys 46 and 47, pulley 48 forming a becket so that the device is balanced and does not tilt. As may be seen in Fig. 1, on one end of the chain is a hook member 53 which may be hooked through the object being tested which may be, for example, the cylindrical pipe coupling 54. The pipe coupling may be immersed in the tank of water indicated at 17. Numeral 55 designates a stop or latch member which is secured to the chain 52. This member is in the form of a hollow cone having a curved contour, as shown, the curved contour forming a cam surface, as will be described. The member 55 is relatively close to the hook member 53. When an article or object is being weighed in air, the member 55 is latched in the position as shown in Fig. 1 to hold the object in position. The latch mechanism comprises a pair of lever arms 56 and 57 having their upper ends pivoted between the side walls 44 and 45 of the manipulator. At their lower ends these lever arms carry inwardly and upwardly extending latching fingers 60 and 61 which are notched near their projective ends, as shown. The latching members are operable by two pairs of links 62 and 63, and 67 and 68 exterior to manipulator 16, the lower ends of which are pivoted to the lower ends of the arms 56 and 57 and the upper ends of which are all pivoted to a pin 69. The pin 69 is carried by a manual operating lever 65 and it moves in arcuate slots in the side plates 44 and 45 of manipulator 16. The left end of the lever 65 is pivoted, as shown at 66, to the side plate 44, and, as may be seen, when the lever 65 moves in a counter-clockwise direction, its point of attachment to the pairs of links moves upwardly thus allowing the lower ends of the arms 56 and 57 to move inwardly to bring the latch fingers 60 and 61 under the member 55. The latch fingers normally move inwardly automatically under the influence of tension springs 70 and 76 connected between the links 62 and 63 and between the links 67 and 68 respectively. When the lever 65 is moved downwardly, the latching fingers 60 and 61 move outwardly, disengaging their notched inner ends from the lower edges of the member 55.

The manipulating lever 65 is shown as having a hand grip at 71 and numeral 72 designates a pair of brackets extending from plates 44 and 45, the brackets have holes therein, as shown, which form a finger or trigger hold for steadying the manipulator during operations.

Numeral 73 designates a rubber stop on the chain 52 positioned to engage the lower edge of the manipulator 16 to limit the downward movement of the hook member 53 when the object being tested is lowered into the tank 17. Attached to the chain 52 below the stop 73 is a mass or bulk 75 which emerges from the water when the hook member 53 enters it. The mass or bulk 75 with its immersed supporting chain corresponds in volume and mass to the hook 53 with its immersed supporting chain so as to compensate for the buoyant effect of the water on the hook member 53 when the latter is immersed in the liquid in tank 17.

In performing a test, one of the objects, such as the coupling 54, is placed on the hook member 53, and it is weighed with the parts as shown in Fig. 1. If its indicated weight is, for example, 5 pounds, the knob 30 is turned until the black pointers match on the face of the dial of the scale 10, and the red pointer, as previously described, will then stand at a position which is in the ratio of 3 to 5 relative to pointer 32. For example, if the weight in air is 5 pounds, the red pointer will stand at 3 pounds, as shown on the drawing. The knob 30 is left in this position while the coupling is now weighed in water. To do this the manipulator handle 71 is moved downwardly which disengages the latching fingers from the latch member 55, and the coupling descends into the tank 17 with the chain 52 passing over the pulleys, as described, until the stop 73 engages the lower edge of the manipulator. The mechanism of the manipulator will then be as shown in Fig. 2. The position of the black pointer 21 is now observed relative to the position of the red pointer 41. If the black pointer 21 indicates a weight greater than three, that is, greater than that indicated by the red pointer, the density of the coupling is in excess of 2.5, and it is satisfactory. Where the operator is interested in the actual weight of the sample, the weight scale should be accurately calibrated. It is to be observed, however, that it is not necessary for the proper functioning of the device that the dial of the scale be calibrated numerically or otherwise since it is not necessary to actually determine numerically the weight either in air or in water. It is only necessary that the red pointer occupy a position having the proper ratio to the weight-in-air pointer and then to observe if the weight in water is greater or less.

When the hook 53 is raised in removing the object from the water, member 55 due to its curved cam surface will automatically spread the latch fingers 60 and 61 and latch itself above them.

From the foregoing those skilled in the art will observe that I have provided an apparatus and technique whereby an inspection or test can be rapidly made on products or articles to determine their quality in terms of their relative density. The inspection or test can very quickly be made since it is only necessary to set the indicating red pointer in the proper position and then compare the position of the weight pointer relative to the red pointer when the object is weighed in water. The manipulator provides a convenient and effective means of weighing the object in air and then lowering it into the tank for weighing it in water. With the aforedescribed apparatus and method, a great many articles can be tested in a short time by a single operator, thereby providing a very effective but yet inexpensive test or inspection of the articles. No computations are involved in carrying out the test nor is there any use of tables or formulas. Thus the time required for each test is reduced to a minimum.

It is to be understood that where "water" is referred to in the foregoing this is to be interpreted to mean any suitable liquid since it is obvious that the liquid used need not necessarily be water.

The foregoing disclosure is representative of a preferred form of my invention. It is to be understood, however, that various alternatives, modifications, and variations may be practiced and adopted by those skilled in the art, and it is to be understood that such variations and alternatives are intended to be embraced within the scope of the claims appended hereto.

What I claim is:

1. An apparatus for inspecting objects by determining whether or not their relative density meets a predetermined standard comprising, in combination, means comprising a scale for weighing an object, said scale having a movable first pointer, and means comprising a second pointer operable for manual setting and retention at a position corresponding to that taken by said first pointer in indicating the weight of an object weighed by said scale in air, a third pointer, and means interconnecting said second and third pointers to move said third pointer to a position which is representative of a predetermined proportion of the amount represented by the second pointer, said predetermined proportion being the relative weight the object must have in liquid of known density to meet the relative density standard, and means for suspending an object from said scale for successively weighing the object thereby, first in air and then in liquid, whereby the indication by said first pointer of the weight in liquid can be readily and quickly compared with the indication of the third pointer to indicate whether or not the relative density of the object meets the predetermined standard.

2. An apparatus for inspecting objects by determining whether or not their relative density meets a predetermined standard comprising, in combination, means comprising a scale for weighing an object, said scale having a movable first pointer, means comprising a second pointer operable for manual adjustment to assume and retain a position matching that taken by said first pointer in indicating the weight of an object weighed by said scale in air, a third pointer, and means interconnecting said second and third pointers to move said third pointer to a position representing a predetermined proportion of the indication of the second pointer, the said proportion being that weight, indicated by said first pointer, in liquid of known density which the object must have to meet the relative density standard, means suspended from the scale for suspending an object therefrom for successively weighing the object, first in air and then in liquid, whereby the indication by said first pointer of the weight in liquid can be readily and quickly compared with the indication of the third pointer to indicate whether or not the relative density of the object meets the predetermined standard.

3. An apparatus for inspecting objects by determining whether or not their relative density meets a predetermined standard comprising, in combination, a weighing scale having an indicator scale and an indicator movable thereover, means associated with said indicator scale for setting up and retaining a visual indication thereagainst which is representative of a predetermined proportion of the indicator reading, the said proportion being that proportionate part of the weight in air that the object must have in liquid of known density to meet the relative density standard, means for suspending an object from said scale for successively weighing the object thereby, first in air and then in liquid, whereby the indication by said indicator of the weight in liquid can be readily and quickly compared with said retained visual indication to indicate whether or not the relative density of the object meets the predetermined standard.

4. As an article of manufacture, a differential comparator comprising a frame, a first shaft rotatably mounted therein having a pointer thereon and rotatable therewith, a second concentric shaft rotatably mounted in said frame and having a pointer thereon and rotatable therewith adjacent axially to the aforementioned pointer, means interconnecting the shafts whereby the movement of one bears a predetermined ratio to the movement of the other, said frame comprising a housing in which shafts are journaled for rotation as aforesaid, and a transparent dial disposed against one wall of said housing and having bordering edge portions extending radially therebeyond, said concentric shafts extending through said one wall of said housing and said transparent dial and carrying their respective pointers for rotation over said dial, the free ends of said pointers lying radially beyond the margins of the housing so as to be visible against and through said bordering edge portions of said transparent dial.

5. In apparatus of the character described, in combination, means comprising a dial having a first pointer rotatable about a central axis, a differential comparator mounted adjacent said dial, said comparator comprising a frame having a first shaft rotatably mounted therein coaxially aligned with the axis of said first pointer, said first shaft having a second pointer thereon and rotatable therewith adjacent said dial pointer, said frame having mounted therein a second shaft concentric with said first shaft and having a third pointer thereon and rotatable therewith adjacent said first and second pointers, and means interconnecting the shafts whereby the movement of one shaft bears a predetermined ratio to the movement of the other shaft, said frame comprising a housing in which said shafts are journaled for rotation as aforesaid and having one wall spaced adjacently opposite to and facing said dial and first pointer, said shafts extending through said one wall toward said dial and said first pointer but terminating in spaced relation therefrom, said housing having marginal edges, said dial and all of said pointers extending radially beyond said marginal edges so that their free ends are visible for comparison against each other and said dial.

6. The invention defined in claim 5, and a transparent plate disposed against said one wall of said housing and spaced from said dial and having marginal edges extending beyond the marginal edges of said housing, said shafts extending through said plate, all of said pointers having their free ends projecting radially beyond the marginal edges of the housing and visible through said plate and against said dial.

7. The invention defined in claim 6, and said first shaft having one end extending through a wall of said housing opposite said one wall and having a manual rotating knob on said one end, whereby said second pointer can be set to a position corresponding to that taken by said first pointer, and said third pointer will assume a position in predetermined relation to the first and second pointers.

8. The invention defined in claim 4, and said first shaft having one end extending through a wall of said housing opposite said one wall and having a manual rotating knob on said one end.

9. Apparatus for inspecting objects by determining whether their relative density meets a predetermined standard comprising, in combination, a weighing scale having an indicator dial and an indicator movable thereover, means for setting up independently of said indicator a visual indication against said indicator dial which is representative of a predetermined proportion of the indicator reading, the said proportion being that proportionate part of the weight in air that the object must have in liquid of known density to meet the predetermined relative density standard, and means for suspending an object from said scale for successively weighing the object thereby, first in air and then in liquid, whereby the indication of the weight in liquid can be readily and quickly compared against said proportionate visual indication to determine whether the relative density of the object meets the predetermined standard.

10. Apparatus for inspecting objects by determining whether or not their relative density meets a predetermined standard comprising, in combination, means comprising a scale for weighing an object, said scale having a dial and a first pointer movable thereover, and means comprising a second, transparent dial, a second pointer mounted for movement over said second dial and operable for manual setting and retention at a position corresponding to that taken by said first pointer in indicating the weight of an object weighed by said scale in air, a third pointer, and means interconnecting said second and third pointers to move said third pointer to a position representative of a predetermined proportion of the amount represented by the second pointer, said predetermined proportion being the relative weight the object must have in liquid of known density to meet the relative density standard, said transparent dial being aligned with said scale dial opposite thereto so that the scale dial is visible therethrough, said first, second, and third pointers being mounted for travel over paths on their dials that coincide with each other, and means for suspending an object from said scale for successively weighing the object thereby, first in air and then in liquid, whereby the indication by said first pointer of the weight in liquid can be readily and quickly compared with the indication of the third pointer to indicate whether or not the relative density of the object meets the predetermined standard.

References Cited in the file of this patent

UNITED STATES PATENTS

| | | |
|---|---|---|
| 2,148,923 | Beisser | Feb. 28, 1939 |
| 2,157,705 | Jones | May 9, 1939 |
| 2,157,706 | Jones | May 9, 1939 |
| 2,211,299 | Smith | Aug. 13, 1940 |
| 2,341,225 | MacClatchie | Feb. 8, 1944 |
| 2,571,415 | Brown | Oct. 16, 1951 |
| 2,607,188 | Bourquin | Aug. 19, 1952 |

FOREIGN PATENTS

| | | |
|---|---|---|
| 16,536 | Great Britain | July 15, 1909 |
| 320,416 | Great Britain | Oct. 14, 1928 |